United States Patent
Li et al.

(10) Patent No.: US 12,135,467 B2
(45) Date of Patent: Nov. 5, 2024

(54) OPTICAL IMAGING LENS ASSEMBLY

(71) Applicant: Zhejiang Sunny Optics Co., Ltd, Yuyao (CN)

(72) Inventors: Yang Li, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 483 days.

(21) Appl. No.: 17/524,858

(22) Filed: Nov. 12, 2021

(65) Prior Publication Data
US 2022/0155558 A1    May 19, 2022

(30) Foreign Application Priority Data
Nov. 16, 2020  (CN) .......................... 202011279582.3

(51) Int. Cl.
*G02B 9/34*    (2006.01)
*G02B 13/00*   (2006.01)

(52) U.S. Cl.
CPC ............. *G02B 9/34* (2013.01); *G02B 13/004* (2013.01)

(58) Field of Classification Search
CPC .......................... G02B 13/004; G02B 9/34–58
See application file for complete search history.

(56) References Cited

U.S. PATENT DOCUMENTS

| | | | | |
|---|---|---|---|---|
| 2009/0128927 A1* | 5/2009 | Chen | ..................... | G02B 13/004 |
| | | | | 359/715 |
| 2010/0110562 A1* | 5/2010 | Aoi | ....................... | G02B 13/006 |
| | | | | 359/772 |
| 2010/0172024 A1* | 7/2010 | Sakagami | ................ | G02B 9/34 |
| | | | | 359/570 |
| 2013/0155526 A1* | 6/2013 | Hsieh | ....................... | G02B 9/34 |
| | | | | 359/715 |
| 2014/0036133 A1* | 2/2014 | Sekine | .................. | G02B 13/004 |
| | | | | 348/340 |
| 2015/0286032 A1* | 10/2015 | Hsueh | ................ | G02B 27/0025 |
| | | | | 359/357 |
| 2016/0227089 A1* | 8/2016 | Lin | ......................... | G02B 15/00 |
| 2019/0056565 A1* | 2/2019 | Yang | ......................... | G02B 3/02 |
| 2019/0121092 A1* | 4/2019 | Chang | ..................... | G02B 7/028 |
| 2019/0170972 A1* | 6/2019 | Huang | ..................... | G02B 9/34 |
| 2019/0243107 A1* | 8/2019 | Hsu | ........................... | G02B 9/64 |
| 2020/0018930 A1* | 1/2020 | Tseng | .................. | G02B 13/004 |
| 2020/0257081 A1* | 8/2020 | Huang | .................... | G02B 13/18 |
| 2020/0406874 A1* | 12/2020 | Chang | ................ | G02B 13/0045 |
| 2021/0072499 A1* | 3/2021 | Wenren | ................ | G02B 13/004 |
| 2022/0236528 A1* | 7/2022 | Xie | ....................... | G02B 13/004 |

\* cited by examiner

*Primary Examiner* — Ephrem Z Mebrahtu
(74) *Attorney, Agent, or Firm* — Barnes & Thornburg LLP

(57) ABSTRACT

An optical imaging lens assembly is provided, along an optical axis from an object side to an image side, sequentially includes: a first lens having positive refractive power; a second lens having refractive power, and an object-side surface of the second lens being a convex surface; a third lens having refractive power, an object-side surface of the third lens being a convex surface, and an image-side surface of the third lens being a convex surface; and a fourth lens having refractive power. Half of a maximum field-of-view Semi-FOV of the optical imaging lens assembly and a maximum incident angle of a chief ray CRAmax of the optical imaging lens assembly to an electronic photosensitive component satisfy: 2.5<Tan(Semi-FOV+CRAmax) <3.5.

20 Claims, 8 Drawing Sheets

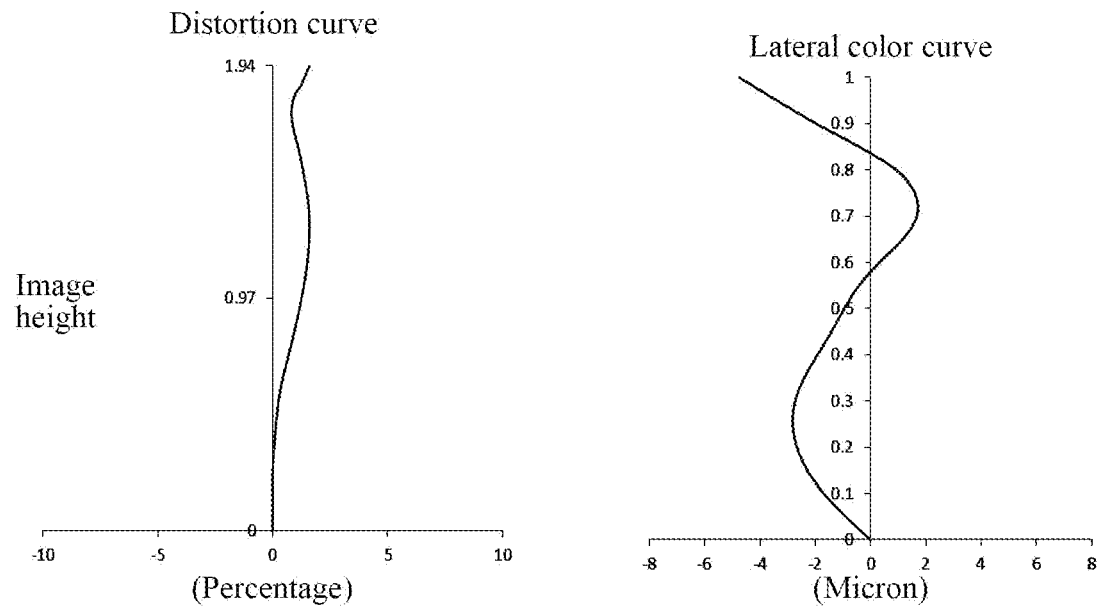
Fig. 2C
Fig. 2D
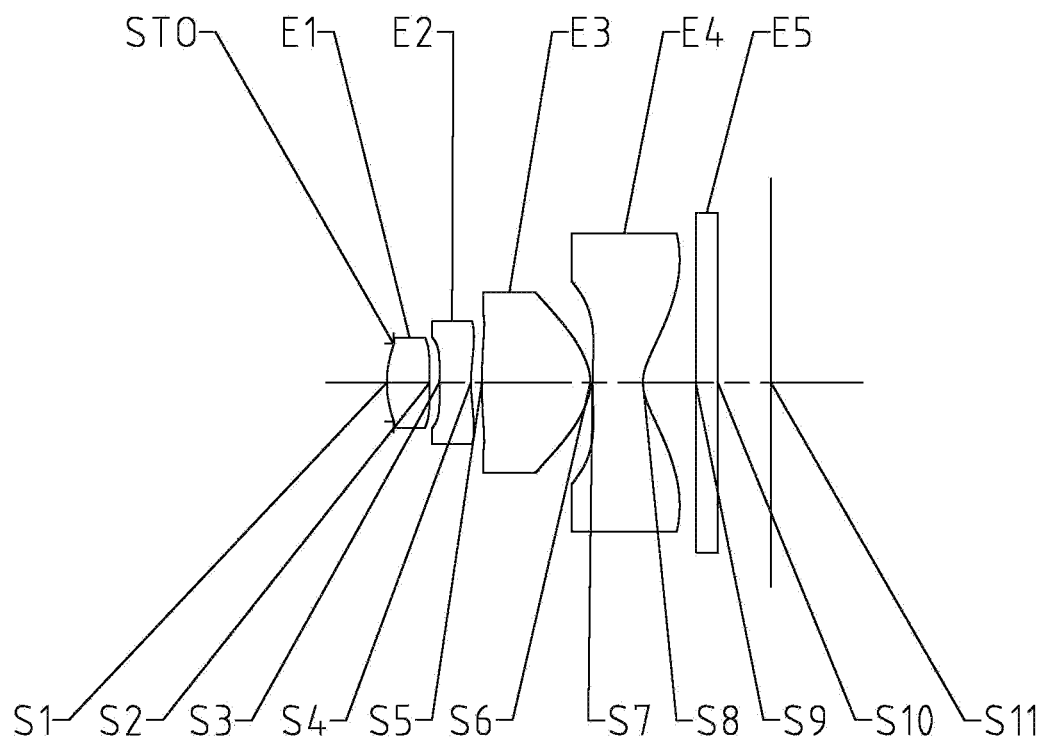
Fig. 3

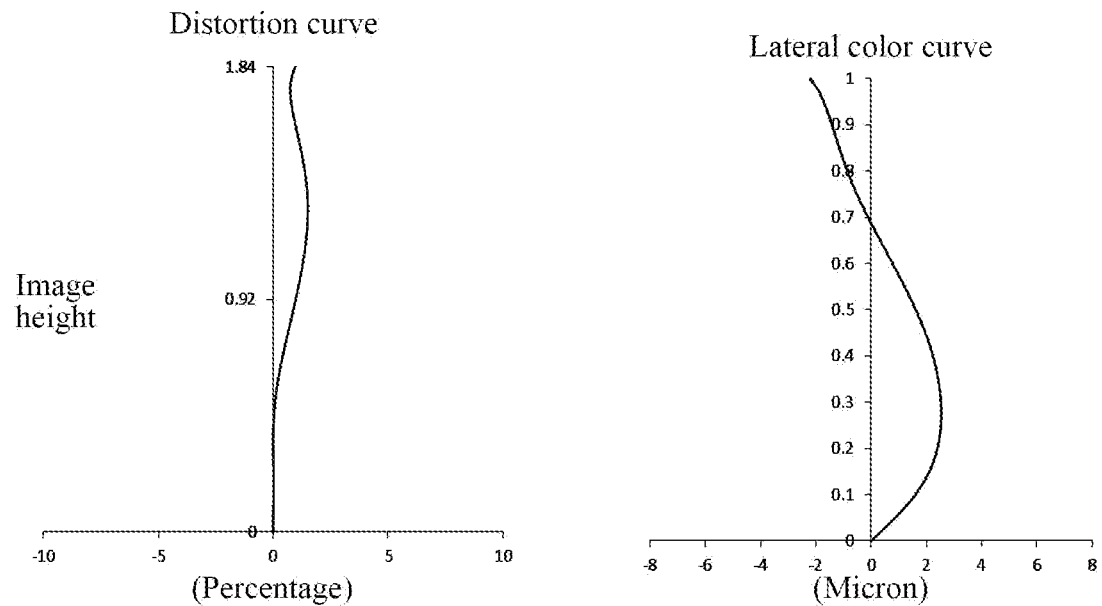
Fig. 6C
Fig. 6D
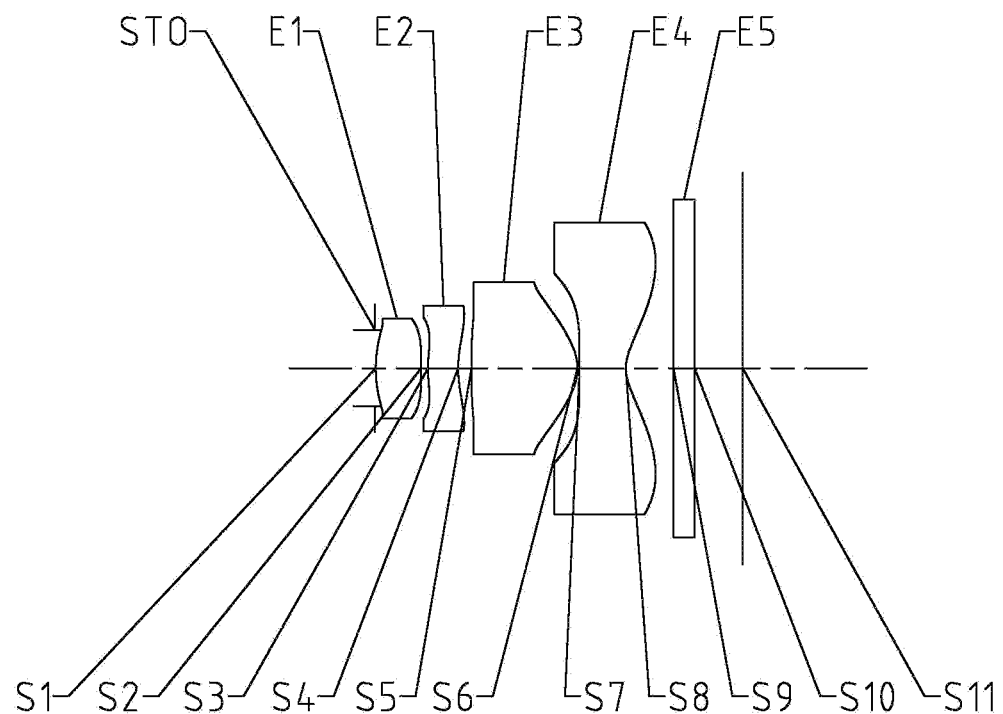
Fig. 7

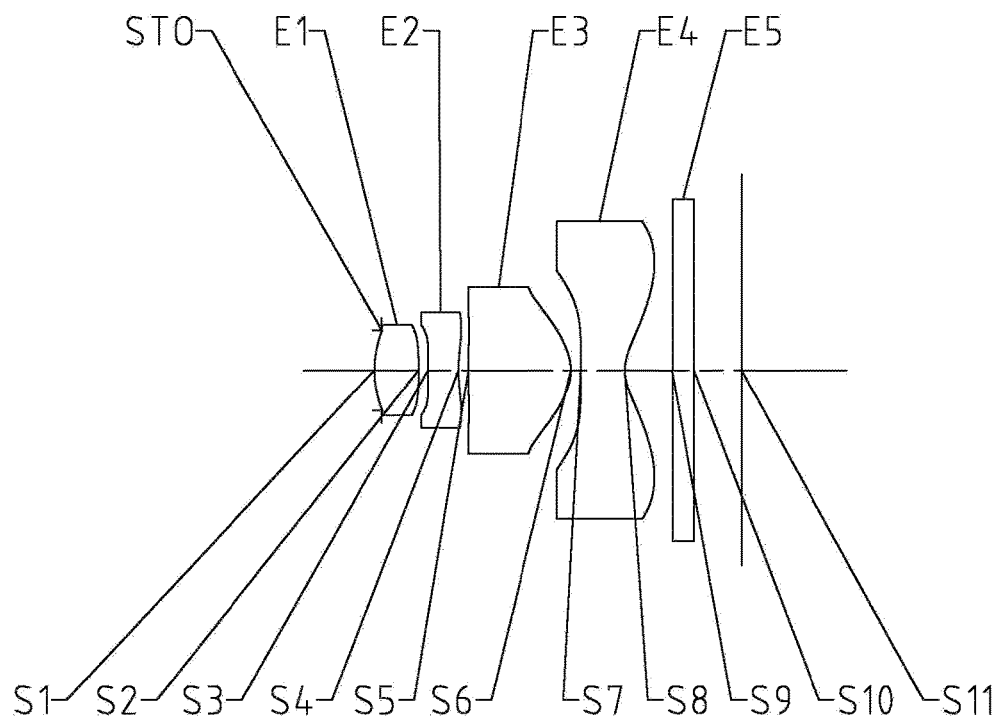
Fig. 9
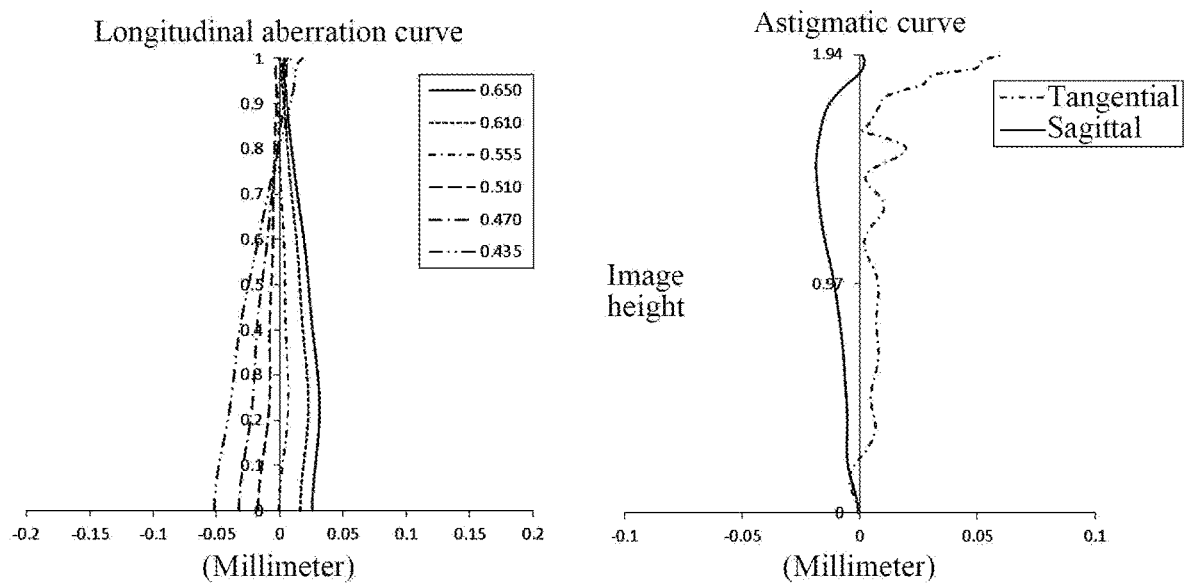
Fig. 10A
Fig. 10B

OPTICAL IMAGING LENS ASSEMBLY

CROSS-REFERENCE TO RELATED APPLICATIONS

This application claims the priority from Chinese Patent Application No. 202011279582.3, filed in the National Intellectual Property Administration (CNIPA) on Nov. 16, 2020, the content of which is hereby incorporated by reference in its entirety.

TECHNICAL FIELD

The present disclosure relates to the field of optical elements, and in particular, to an optical imaging lens assembly.

BACKGROUND

With the rapid replacement of portable electronic products such as smart phones, current smart phones, compared with traditional mobile phones, not only have a call function, but also become a photographing device that people carry around. The photographing function of the smart phones has obviously become one of the main innovations in the upgrading of the smart phones. At the same time, users have increasingly higher requirements for the pixel and imaging quality of mobile phone imaging lens assemblies.

SUMMARY

The present disclosure provides an optical imaging lens assembly, and the optical imaging lens assembly along an optical axis from an object side to an image side sequentially includes: a first lens having positive refractive power; a second lens having refractive power, and an object-side surface of the second lens being a convex surface; a third lens having refractive power, an object-side surface of the third lens being a convex surface, and an image-side surface of the third lens being a convex surface; and a fourth lens having refractive power. Half of a maximum field-of-view Semi-FOV of the optical imaging lens assembly and a maximum incident angle of a chief ray CRAmax of the optical imaging lens assembly to an electronic photosensitive component may satisfy: 2.5<Tan(Semi-FOV+CRAmax)<3.5.

In an implementation, at least one of the surfaces of the lenses is an aspheric surface from the object-side surface of the first lens to the image-side surface of the fourth lens.

In an implementation, a combined focal length f12 of the first lens and the second lens and a combined focal length f23 of the second lens and the third lens satisfy: 2.0<f12/f23<4.0.

In an implementation, a center thickness CT1 of the first lens on the optical axis and a center thickness CT3 of the third lens on the optical axis satisfy: 2.0<CT3/CT1<3.0.

In an implementation, a maximum effective radius DT32 of the image-side surface of the third lens and a contour curve length ARE32 from an intersection of the image-side surface of the third lens and the optical axis to the image-side surface of the third lens at ½ of an entrance pupil diameter of the optical imaging lens assembly satisfy: 1.5<DT32/ARE32<2.5.

In an implementation, an axial distance SAG32 from an intersection of the image-side surface of the third lens and the optical axis to a vertex of an effective radius of the image-side surface of the third lens and an axial distance SAG42 from an intersection of an image-side surface of the fourth lens and the optical axis to a vertex of an effective radius of the image-side surface of the fourth lens satisfy: −3.0<SAG32/SAG42<−1.5.

In an implementation, a radius of curvature R4 of an image-side surface of the second lens and a radius of curvature R8 of an image-side surface of the fourth lens satisfy: 3.0<R4/R8<4.5.

In an implementation, an effective focal length f1 of the first lens and an effective focal length f3 of the third lens satisfy: 1.5<f1/f3<3.5.

In an implementation, a magnification M of the optical imaging lens assembly satisfies: 0.5<M<1.0.

In an implementation, a distance TD from an object-side surface of the first lens to an image-side surface of the fourth lens on the optical axis and half of a diagonal length ImgH of an effective pixel area on an imaging plane of the optical imaging lens assembly satisfy: 1.0<TD/ImgH<1.5.

In an implementation, 1.0<ETL/EIN<1.5, EIN is a distance from an object-side surface of the first lens to an image-side surface of the fourth lens parallel to the optical axis at ½ of an entrance pupil diameter of the optical imaging lens assembly; and ETL is a distance from the object-side surface of the first lens to an imaging plane of the optical imaging lens assembly parallel to the optical axis at ½ of the entrance pupil diameter of the optical imaging lens assembly.

In an implementation, the optical imaging lens assembly further comprises a diaphragm, and a distance OBL from the object side of the optical imaging lens assembly to the diaphragm on the optical axis and half of a diagonal length ImgH of an effective pixel area on an imaging plane of the optical imaging lens assembly satisfy: 1.5<OBL/ImgH<2.0.

According to another aspect, the present disclosure provides an optical imaging lens assembly, along an optical axis from an object side to an image side, sequentially comprising: a diaphragm; a first lens having positive refractive power; a second lens having refractive power, and an object-side surface of the second lens being a convex surface; a third lens having refractive power, an object-side surface of the third lens being a convex surface, and an image-side surface of the third lens being a convex surface; a fourth lens having refractive power; and a distance OBL from the object side of the optical imaging lens assembly to the diaphragm on the optical axis and half of a diagonal length ImgH of an effective pixel area on an imaging plane of the optical imaging lens assembly satisfy: 1.5<OBL/ImgH<2.0.

In an implementation, a combined focal length f12 of the first lens and the second lens and a combined focal length f23 of the second lens and the third lens satisfy: 2.0<f12/f23<4.0.

In an implementation, a center thickness CT1 of the first lens on the optical axis and a center thickness CT3 of the third lens on the optical axis satisfy: 2.0<CT3/CT1<3.0.

In an implementation, a maximum effective radius DT32 of the image-side surface of the third lens and a contour curve length ARE32 from an intersection of the image-side surface of the third lens and the optical axis to the image-side surface of the third lens at ½ of an entrance pupil diameter of the optical imaging lens assembly satisfy: 1.5<DT32/ARE32<2.5.

In an implementation, an axial distance SAG32 from an intersection of the image-side surface of the third lens and the optical axis to a vertex of an effective radius of the image-side surface of the third lens and an axial distance SAG42 from an intersection of an image-side surface of the fourth lens and the optical axis to a vertex of an effective radius of the image-side surface of the fourth lens satisfy: −3.0<SAG32/SAG42<−1.5.

In an implementation, a radius of curvature R4 of an image-side surface of the second lens and a radius of curvature R8 of an image-side surface of the fourth lens satisfy: 3.0<R4/R8<4.5.

In an implementation, an effective focal length f1 of the first lens and an effective focal length f3 of the third lens satisfy: 1.5<f1/f3<3.5.

In an implementation, a magnification M of the optical imaging lens assembly satisfies: 0.5<M<1.0.

In an implementation, a distance TD from an object-side surface of the first lens to an image-side surface of the fourth lens on the optical axis and half of the diagonal length ImgH of the effective pixel area on the imaging plane of the optical imaging lens assembly satisfy: 1.0<TD/ImgH<1.5.

In an implementation, 1.0<ETL/EIN<1.5, EIN is a distance from an object-side surface of the first lens to an image-side surface of the fourth lens parallel to the optical axis at ½ of an entrance pupil diameter of the optical imaging lens assembly; and ETL is a distance from the object-side surface of the first lens to the imaging plane of the optical imaging lens assembly parallel to the optical axis at ½ of the entrance pupil diameter of the optical imaging lens assembly.

In an implementation, half of a maximum field-of-view Semi-FOV of the optical imaging lens assembly and a maximum incident angle of a chief ray CRAmax of the optical imaging lens assembly to an electronic photosensitive component satisfy: 2.5<Tan(Semi-FOV+CRAmax)<3.5.

The present disclosure employs a plurality of (for example, four) lenses. By reasonably distributing the refractive power of each lens, the surface shape, the center thickness of each lens and the spaced intervals along the optical axis between the lenses, the optical imaging lens assembly has at least one beneficial effect such as miniaturization, good macro shooting effect, high magnification, or high imaging quality.

BRIEF DESCRIPTION OF THE DRAWINGS

By reading detailed description of non-limiting embodiments with reference to the following accompanying drawings, other features, objectives and advantages of the present disclosure will be more apparent:

FIGS. 2A-2D respectively illustrate a longitudinal aberration curve, an astigmatic curve, a distortion curve and a lateral color curve of the optical imaging lens assembly according to Embodiment 1;

FIG. 3 is a schematic structural diagram illustrating an optical imaging lens assembly according to Embodiment 2 of the present disclosure;

FIGS. 6A-6D respectively illustrate a longitudinal aberration curve, an astigmatic curve, a distortion curve and a lateral color curve of the optical imaging lens assembly according to Embodiment 3;

FIG. 7 is a schematic structural diagram illustrating an optical imaging lens assembly according to Embodiment 4 of the present disclosure;

FIG. 9 is a schematic structural diagram illustrating an optical imaging lens assembly according to Embodiment 5 of the present disclosure; and FIGS. 10A-10D respectively illustrate a longitudinal aberration curve, an astigmatic curve, a distortion curve and a lateral color curve of the optical imaging lens assembly according to Embodiment 5.

DETAILED DESCRIPTION OF EMBODIMENTS

Figure 1:
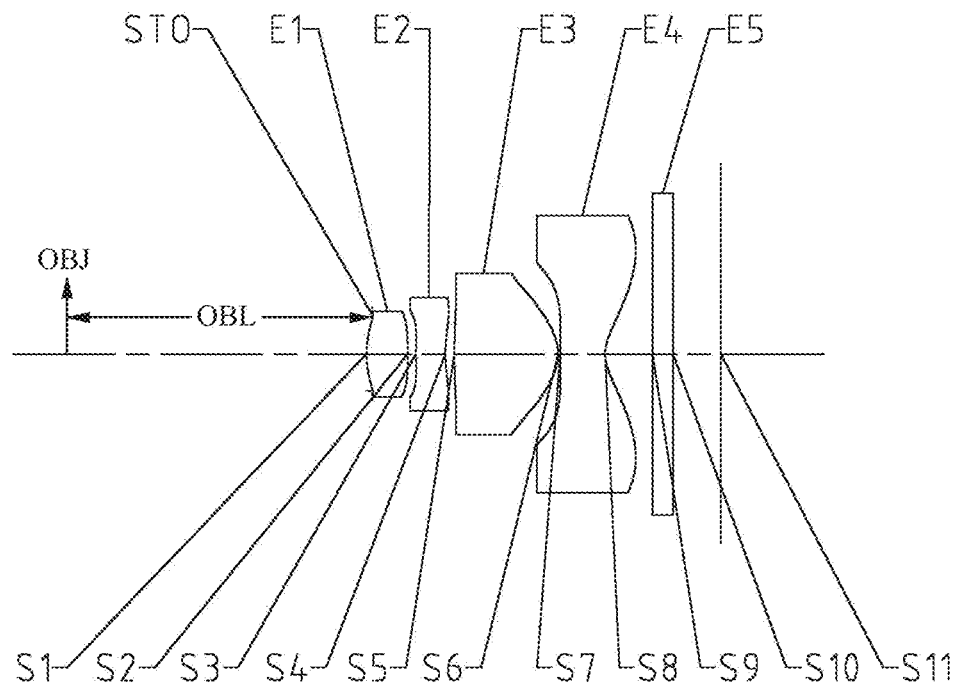
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of" when preceding a list of features, modify the entire list of features rather than an individual element in the list. Further, the use of "may" when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary implementations of the present disclosure may include four lenses having refractive powers, that is, a first lens, a second lens, a third lens and a fourth lens, respectively. The four lenses are sequentially arranged from the object side to the image side along the optical axis. Any two adjacent lenses in the first lens to the fourth lens may have a spacing distance in between.

In an exemplary implementation, the first lens may have positive refractive power; the second lens may have positive refractive power or negative refractive power, and an object-side surface of the second lens may be a convex surface; the third lens may have positive refractive power or negative refractive power, an object-side surface of the third lens may be a convex surface, and an image-side surface of the third lens may be a convex surface; and the fourth lens may have positive refractive power or negative refractive power. By reasonably setting the refractive power and surface shape characteristics of the first lens to the fourth lens, it is conducive to the realization of macro photography and miniaturization of the optical imaging lens assembly.

In an exemplary implementation, the optical imaging lens assembly according to the present disclosure may satisfy: $2.0<f12/f23<4.0$, where f12 is a combined focal length of the first lens and the second lens, and f23 is a combined focal length of the second lens and the third lens. More specifically, f12 and f23 may further satisfy: $2.3<f12/f23<3.8$. Satisfying $2.0<f12/f23<4.0$ is conducive to the rational distribution of the refractive power of the first lens, the second lens and the third lens, and may make the optical imaging lens assembly have a reasonable magnification during macro shooting. At the same time, this setting is also conducive to reducing aberrations of the optical imaging lens assembly and improving an imaging quality of the optical imaging lens assembly during macro shooting.

In an exemplary implementation, the optical imaging lens assembly according to the present disclosure may satisfy: $2.0<CT3/CT1<3.0$, where CT1 is a center thickness of the first lens on the optical axis, and CT3 is a center thickness of the third lens on the optical axis. More specifically, CT3 and CT1 may further satisfy: $2.3<CT3/CT1<2.7$. Satisfying $2.0<CT3/CT1<3.0$ is beneficial for the shape the first lens and the shape of the third lens to cooperate with each other, so that a relative brightness of the periphery of the lens assembly may be effectively improved, and at the same time, it is beneficial to improve the assembly yield of the lens assembly.

In an exemplary implementation, the optical imaging lens assembly according to the present disclosure may satisfy: $1.5<DT32/ARE32<2.5$, where DT32 is a maximum effective radius of the image-side surface of the third lens, and ARE32 is a contour curve length from an intersection of the image-side surface of the third lens and the optical axis to the image-side surface of the third lens at ½ of an entrance pupil diameter of the optical imaging lens assembly. In other words, ARE32 is the length of a contour curve on the image-side surface of the third lens, and specifically is the length of the third lens contour curve extending in a radial direction of the third lens between the intersection of the image-side surface of the third lens and the optical axis and the point where the image-side surface of the third lens at ½ of the entrance pupil diameter of the optical imaging lens assembly. More specifically, DT32 and ARE32 may further satisfy: $1.9<DT32/ARE32<2.2$. Satisfying $1.5<DT32/ARE32<2.5$ may prevent the maximum effective radius of the third lens from being too large, which is conducive to the miniaturization of the optical imaging lens assembly.

In an exemplary implementation, the optical imaging lens assembly according to the present disclosure may satisfy: $-3.0<SAG32/SAG42<-1.5$, where SAG32 is an axial distance from an intersection of the image-side surface of the third lens and the optical axis to a vertex of an effective radius of the image-side surface of the third lens, and SAG42 is an axial distance from an intersection of an image-side surface of the fourth lens and the optical axis to a vertex of an effective radius of the image-side surface of the fourth lens. More specifically, SAG32 and SAG42 may further satisfy: $-2.5<SAG32/SAG42<-1.5$. Satisfying $-3.0<SAG32/SAG42<-1.5$ may avoid excessive bending of the third lens, reduce processing difficulty, and may make the assembly of the optical imaging lens assembly more stable at the same time.

In an exemplary implementation, the optical imaging lens assembly according to the present disclosure may satisfy: $3.0<R4/R8<4.5$, where R4 is a radius of curvature of an image-side surface of the second lens, and R8 is a radius of curvature of an image-side surface of the fourth lens. More specifically, R4 and R8 may further satisfy: $3.0<R4/R8<4.3$. Satisfying $3.0<R4/R8<4.5$, may reduce the transmission angle of the chief ray.

In an exemplary implementation, the optical imaging lens assembly according to the present disclosure may satisfy: $1.5<f1/f3<3.5$, where f1 is an effective focal length of the first lens, and f3 is an effective focal length of the third lens. More specifically, f1 and f3 may further satisfy: $1.9<f1/f3<3.1$. Satisfying $1.5<f1/f3<3.5$ is beneficial to shorten the size of the optical imaging lens assembly and may effectively correct lens assembly aberrations.

In an exemplary implementation, the optical imaging lens assembly according to the present disclosure may satisfy: $0.5<M<1.0$, where M is a magnification of the optical imaging lens assembly, that is, a ratio of the imaging size of the object on the imaging plane through the lens assembly to the actual size of the object. More specifically, M may further satisfy: $0.7<M<1.0$. Satisfying $0.5<M<1.0$ is beneficial for the optical imaging lens assembly to have higher magnification, so that more object details can be obtained during macro shooting, and the imaging quality of the details of the object may be improved.

In an exemplary implementation, the optical imaging lens assembly according to the present disclosure may satisfy:

2.5<Tan(Semi-FOV+CRAmax)<3.5, where Semi-FOV is half of a maximum field-of-view of the optical imaging lens assembly, and CRAmax is a maximum incident angle of a chief ray of the optical imaging lens assembly to an electronic photosensitive component. Satisfying 2.5<Tan(Semi-FOV+CRAmax)<3.5 is beneficial to reduce the incident angle when light enters the optical imaging lens assembly, so that the optical imaging lens assembly has a smaller field-of-view.

In an exemplary implementation, the optical imaging lens assembly according to the present disclosure may satisfy: 1.0<TD/ImgH<1.5, where TD is a distance from an object-side surface of the first lens to the image-side surface of the fourth lens on the optical axis, and ImgH is half of a diagonal length of an effective pixel area on an imaging plane of the optical imaging lens assembly. More specifically, TD and ImgH may further satisfy: 1.2<TD/ImgH<1.5. Satisfying 1.0<TD/ImgH<1.5 is beneficial for the optical imaging lens assembly to achieve a higher magnification effect within a small shooting distance, so that more details of the object may be captured.

In an exemplary implementation, the optical imaging lens assembly according to the present disclosure may satisfy: 1.0<ETL/EIN<1.5, where EIN is a distance from an object-side surface of the first lens to the image-side surface of the fourth lens parallel to the optical axis at ½ of the entrance pupil diameter of the optical imaging lens assembly, and ETL is a distance from the object-side surface of the first lens to an imaging plane of the optical imaging lens assembly parallel to the optical axis at ½ of the entrance pupil diameter of the optical imaging lens assembly. More specifically, ETL and EIN may further satisfy: 1.1<ETL/EIN<1.3. Satisfying 1.0<ETL/EIN<1.5, the shape of the fourth lens may be set reasonably, the processing difficulty may be reduced, and the assembly of the optical imaging lens assembly may be more stable at the same time.

In an exemplary implementation, the optical imaging lens assembly according to the present disclosure may further include a diaphragm arranged between the object side and the first lens. Alternatively, the above optical imaging lens assembly may further include an optical filter for correcting the color deviation and/or a cover glass for protecting the photosensitive element located on the imaging plane.

In an exemplary implementation, the optical imaging lens assembly according to the present disclosure may satisfy: 1.5<OBL/ImgH<2.0, where ImgH is half of a diagonal length of an effective pixel area on an imaging plane of the optical imaging lens assembly, and OBL is a distance from the object side of the optical imaging lens assembly to the diaphragm on the optical axis. In other words, OBL is the distance from the object to the diaphragm on the optical axis, when the object OBJ is the farthest from the imaging plane on the basis that the object OBJ can be clearly imaged on the imaging plane of the optical imaging lens assembly. More specifically, OBL and ImgH may further satisfy: 1.5<OBL/ImgH<1.7. Satisfying 1.5<OBL/ImgH<2.0 may enable the object on the object side to be clearly imaged on the imaging plane of the optical imaging lens assembly, which is conducive to fully embodying the macro shooting performance of the optical imaging lens assembly.

The optical imaging lens assembly according to the above implementations of the present disclosure may employ a plurality of lenses, such as four lenses as described above. By reasonably distributing the refractive power of each lens, the surface shape, the center thickness of each lens and the spaced intervals along the optical axis between the lenses, it may effectively reduce the volume of the optical imaging lens assembly and improve the workability of the optical imaging lens assembly, such that the optical imaging lens assembly is more advantageous for production processing and may be applied to portable electronic products. The optical imaging lens assembly configured as described above has the characteristics of miniaturization, macro shooting, high magnification, clear imaging, etc., and can well meet the use requirements of various portable electronic products in camera scenarios.

In the implementations of the present disclosure, at least one of the surfaces of the lenses is an aspheric surface, that is, at least one of the surfaces from the object-side surface of the first lens to the image-side surface of the fourth lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate the aberrations that occur during the imaging as much as possible, thereby improving the imaging quality. Alternatively, at least one of the object-side surface and the image-side surface of each of the first lens, the second lens, the third lens and the fourth lens is an aspheric surface. Alternatively, the object-side surface and the image-side surface of each of the first lens, the second lens, the third lens and the fourth lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having four lenses is described as an example in the implementations, the optical imaging lens assembly is not limited to include four lenses. If desired, the optical imaging lens assembly may also include other numbers of lenses.

Specific examples of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly from an object side to an image side sequentially includes: a diaphragm STO, a first lens E1, a second lens E2, a third lens E3, a fourth lens E4, an optical filter E5 and an imaging plane S11.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a convex surface, and an image-side surface S8 of the fourth lens is a concave surface. The optical filter E5 has an object-side surface S9 and an image-side surface S10. Light from an object sequentially passes through the respective surfaces S1 to S10 and is finally imaged on the imaging plane S11.

Table 1 is a table illustrating basic parameters of the optical imaging lens assembly of Embodiment 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 2.9500 | | | | |
| STO | Spherical | Infinite | −0.0581 | | | | |
| S1 | Aspheric | 1.0918 | 0.4167 | 1.55 | 56.1 | 1.85 | −1.3379 |
| S2 | Aspheric | −11.6322 | 0.0832 | | | | 19.4644 |
| S3 | Aspheric | 3.2089 | 0.3000 | 1.67 | 20.4 | −4.15 | 32.2100 |
| S4 | Aspheric | 1.4312 | 0.0911 | | | | −7.9409 |
| S5 | Aspheric | 6.8935 | 1.0544 | 1.55 | 56.1 | 0.83 | −39.8830 |
| S6 | Aspheric | −0.4583 | 0.0200 | | | | −3.4728 |
| S7 | Aspheric | 4.3802 | 0.4571 | 1.55 | 56.1 | −0.78 | −85.0477 |
| S8 | Aspheric | 0.3745 | 0.4818 | | | | −3.4095 |
| S9 | Spherical | Infinite | 0.2100 | 1.52 | 64.2 | | |
| S10 | Spherical | Infinite | 0.4857 | | | | |
| S11 | Spherical | Infinite | | | | | |

In this embodiment, a total effective focal length f of the optical imaging lens assembly is 1.24 mm, a total length TTL of the optical imaging lens assembly (that is, a distance from the object-side surface S1 of the first lens E1 to the imaging plane S11 of the optical imaging lens assembly on the optical axis) is 3.60 mm, half of a diagonal length ImgH of an effective pixel area on the imaging plane S11 of the optical imaging lens assembly is 1.94 mm, half of a maximum field-of-view Semi-FOV of the optical imaging lens assembly is 39.84°, an F number Fno of the optical imaging lens assembly is 1.64, a distance EIN from an object-side surface of the first lens to the image-side surface of the fourth lens parallel to the optical axis at ½ of the entrance pupil diameter of the optical imaging lens assembly is 5.39 mm, an axial distance SAG32 from an intersection of the image-side surface of the third lens and the optical axis to a vertex of an effective radius of the image-side surface of the third lens is −0.47 mm, and a maximum effective radius DT32 of the image-side surface of the third lens is 0.83 mm.

In Embodiment 1, the object-side surface and the image-side surface of any one of the first lens E1 to the fourth lens E4 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2-1 and table 2-2 below show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to each aspheric surface S1 to S8 in Embodiment 1.

TABLE 2-1

| Surface number | A4 | A6 | A8 | A10 | A12 | A14 | A16 |
|---|---|---|---|---|---|---|---|
| S1 | 5.3237E−02 | 1.2557E+00 | −9.3306E+01 | 2.9217E+03 | −5.2954E+04 | 5.7492E+05 | −3.7086E+06 |
| S2 | −1.6051E+00 | 4.8311E+00 | −4.5242E+01 | 1.8139E+02 | 1.8954E+03 | −3.8127E+04 | 2.6546E+05 |
| S3 | −2.3742E+00 | −3.0289E+00 | 1.1383E+02 | −2.1566E+03 | 2.3464E+04 | −1.5652E+05 | 6.1916E+05 |
| S4 | −5.1631E−01 | −2.4767E+00 | 1.7804E+01 | −4.6794E+01 | −2.2700E+02 | 2.5579E+03 | −1.0424E+04 |
| S5 | 2.8058E−01 | −2.3544E+00 | 1.0234E+01 | −4.7331E+01 | 1.4537E+01 | −3.9115E+01 | −1.4843E+03 |
| S6 | −2.0091E+00 | 2.6520E+01 | −2.8998E+02 | 2.1818E+03 | −1.1092E+04 | 3.7090E+04 | −7.2656E+04 |
| S7 | −1.4505E+00 | 1.9564E+01 | −2.3674E+02 | 1.9055E+03 | −1.0642E+04 | 4.2563E+04 | −1.2412E+05 |
| S8 | −8.4760E−01 | 3.6158E+00 | −1.4358E+01 | 4.4002E+01 | −1.0020E+02 | 1.6901E+02 | −2.1178E+02 |

TABLE 2-2

| Surface number | A18 | A20 | A22 | A24 | A26 | A28 | A30 |
|---|---|---|---|---|---|---|---|
| S1 | 1.3087E+07 | −1.9470E+07 | 0.0000E+00 | 0.0000E+00 | 0.0000E+00 | 0.0000E+00 | 0.0000E+00 |
| S2 | −8.7667E+05 | 1.1463E+06 | 0.0000E+00 | 0.0000E+00 | 0.0000E+00 | 0.0000E+00 | 0.0000E+00 |
| S3 | −1.3284E+06 | 1.1987E+06 | 0.0000E+00 | 0.0000E+00 | 0.0000E+00 | 0.0000E+00 | 0.0000E+00 |
| S4 | 2.0918E+04 | −1.6589E+04 | 0.0000E+00 | 0.0000E+00 | 0.0000E+00 | 0.0000E+00 | 0.0000E+00 |
| S5 | 4.5160E+03 | −4.0679E+03 | 0.0000E+00 | 0.0000E+00 | 0.0000E+00 | 0.0000E+00 | 0.0000E+00 |
| S6 | 3.2894E+04 | 2.4902E+05 | −8.0200E+05 | 1.2591E+06 | −1.1542E+06 | 5.9120E+05 | −1.3145E+05 |

TABLE 2-2-continued

| Surface number | A18 | A20 | A22 | A24 | A26 | A28 | A30 |
|---|---|---|---|---|---|---|---|
| S7 | 2.6592E+05 | −4.1774E+05 | 4.7502E+05 | −3.8012E+05 | 2.0282E+05 | −6.4703E+04 | 9.3254E+03 |
| S8 | 1.9712E+02 | −1.3538E+02 | 6.7529E+01 | −2.3740E+01 | 5.5669E+00 | −7.8050E−01 | 4.9438E−02 |

Figures 2A, 2B:
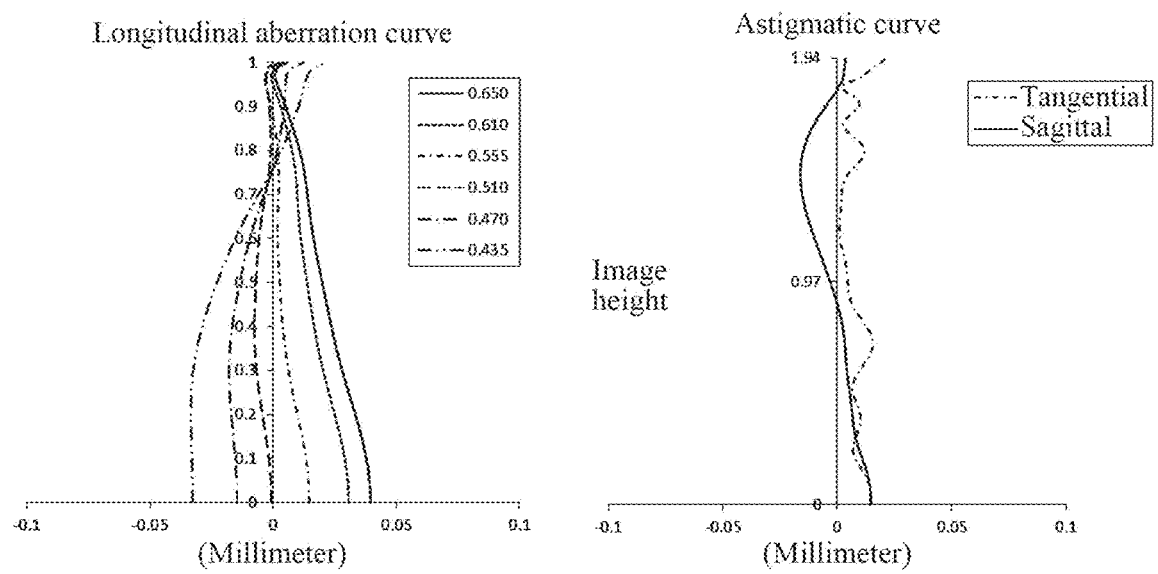

FIG. 2A illustrates the longitudinal aberration curve of the optical imaging lens assembly according to Embodiment 1, representing deviations of focal points converged by light of different wavelengths after passing through the lens assembly. FIG. 2B illustrates the astigmatic curve of the optical imaging lens assembly according to Embodiment 1, representing a curvature of a tangential plane and a curvature of a sagittal plane. FIG. 2C illustrates the distortion curve of the optical imaging lens assembly according to Embodiment 1, representing the amounts of distortion corresponding to different image heights. FIG. 2D illustrates the lateral color curve of the optical imaging lens assembly according to Embodiment 1, representing deviations of different image heights on an imaging plane after light passes through the lens assembly. It can be seen from FIG. 2A to FIG. 2D that the optical imaging lens assembly provided in Embodiment 1 can achieve good imaging quality.

Embodiment 2

An optical imaging lens assembly according to Embodiment 2 of the present disclosure is described below with reference to FIG. 3 to FIG. 4D. In this Embodiment and the following Embodiments, for the purpose of brevity, the description of parts similar to those in Embodiment 1 will be omitted. FIG. 3 illustrates a schematic structural diagram of the optical imaging lens assembly according to Embodiment 2 of the present disclosure.

As shown in FIG. 3, the optical imaging lens assembly from an object side to an image side sequentially includes: a diaphragm STO, a first lens E1, a second lens E2, a third lens E3, a fourth lens E4, an optical filter E5 and an imaging plane S11.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a convex surface, and an image-side surface S8 of the fourth lens is a concave surface. The optical filter E5 has an object-side surface S9 and an image-side surface S10. Light from an object sequentially passes through the respective surfaces S1 to S10 and is finally imaged on the imaging plane S11.

In this embodiment, a total effective focal length f of the optical imaging lens assembly is 1.27 mm, a total length TTL of the optical imaging lens assembly is 3.64 mm, half of a diagonal length ImgH of an effective pixel area on the imaging plane S11 of the optical imaging lens assembly is 1.81 mm, half of a maximum field-of-view Semi-FOV of the optical imaging lens assembly is 38.78°, an F number Fno of the optical imaging lens assembly is 1.70, a distance EIN from an object-side surface of the first lens to the image-side surface of the fourth lens parallel to the optical axis at ½ of the entrance pupil diameter of the optical imaging lens assembly is 5.34 mm, an axial distance SAG32 from an intersection of the image-side surface of the third lens and the optical axis to a vertex of an effective radius of the image-side surface of the third lens is −0.52 mm, and a maximum effective radius DT32 of the image-side surface of the third lens is 0.86 mm.

Table 3 is a table illustrating basic parameters of the optical imaging lens assembly of Embodiment 2, where the units for the radius of curvature, the thickness/distance and the focal length are millimeter (mm). Table 4 shows high-order coefficients applicable to each aspheric surface in Embodiment 2, where the surface shape of each aspheric surface may be defined by the formula (1) given in the above Embodiment 1.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | 2.9000 | | | | |
| STO | Spherical | Infinite | −0.0609 | | | | |
| S1 | Aspheric | 1.0391 | 0.4049 | 1.55 | 56.1 | 1.96 | −0.9280 |
| S2 | Aspheric | 29.6081 | 0.0923 | | | | −90.0000 |
| S3 | Aspheric | 4.7299 | 0.3000 | 1.67 | 20.4 | −3.84 | −51.3897 |
| S4 | Aspheric | 1.6188 | 0.1031 | | | | −8.8767 |
| S5 | Aspheric | 5.2902 | 1.0282 | 1.55 | 56.1 | 0.85 | −55.5082 |
| S6 | Aspheric | −0.4712 | 0.0200 | | | | −3.1971 |
| S7 | Aspheric | 3.4367 | 0.4768 | 1.55 | 56.1 | −0.83 | −60.8988 |
| S8 | Aspheric | 0.3817 | 0.5004 | | | | −3.5128 |
| S9 | Spherical | Infinite | 0.2100 | 1.52 | 64.2 | | |
| S10 | Spherical | Infinite | 0.5043 | | | | |
| S11 | Spherical | Infinite | | | | | |

TABLE 4

| Surface number | A4 | A6 | A8 | A10 | A12 |
|---|---|---|---|---|---|
| S1 | 6.8666E−03 | 6.9871E+00 | −3.3488E+02 | 8.8893E+03 | −1.4296E+05 |
| S2 | −1.2406E+00 | −1.0652E+00 | 9.0580E+01 | −2.2592E+03 | 2.9025E+04 |
| S3 | −2.1997E+00 | 5.4687E+00 | −1.5562E+02 | 2.3988E+03 | −2.4620E+04 |
| S4 | −6.0378E−01 | −2.3777E+00 | 3.6352E+01 | −3.3297E+02 | 2.0114E+03 |
| S5 | 2.5327E−01 | −2.6829E+00 | 2.0514E+01 | −1.4004E+02 | 6.9223E+02 |
| S6 | −9.5838E−01 | 4.8725E+00 | −2.4674E+01 | 9.1762E+01 | −2.3048E+02 |
| S7 | −5.8130E−01 | 1.7869E+00 | −1.0003E+01 | 3.7575E+01 | −8.9766E+01 |
| S8 | −4.1764E−01 | 7.0328E−01 | −1.0432E+00 | 1.1766E+00 | −9.6106E−01 |

| Surface number | A14 | A16 | A18 | A20 |
|---|---|---|---|---|
| S1 | 1.4225E+06 | −8.5806E+06 | 2.8755E+07 | −4.1115E+07 |
| S2 | −2.2994E+05 | 1.1113E+06 | −3.0213E+06 | 3.5514E+06 |
| S3 | 1.5506E+05 | −5.7287E+05 | 1.0795E+06 | −6.9270E+05 |
| S4 | −7.8943E+03 | 1.9186E+04 | −2.6325E+04 | 1.5680E+04 |
| S5 | −2.3131E+03 | 4.8745E+03 | −5.8625E+03 | 3.0531E+03 |
| S6 | 3.7849E+02 | −3.8471E+02 | 2.1717E+02 | −5.1460E+01 |
| S7 | 1.3562E+02 | −1.2523E+02 | 6.4310E+01 | −1.4014E+01 |
| S8 | 5.4344E−01 | −2.0022E−01 | 4.2972E−02 | −4.0450E−03 |

Figure 4A:
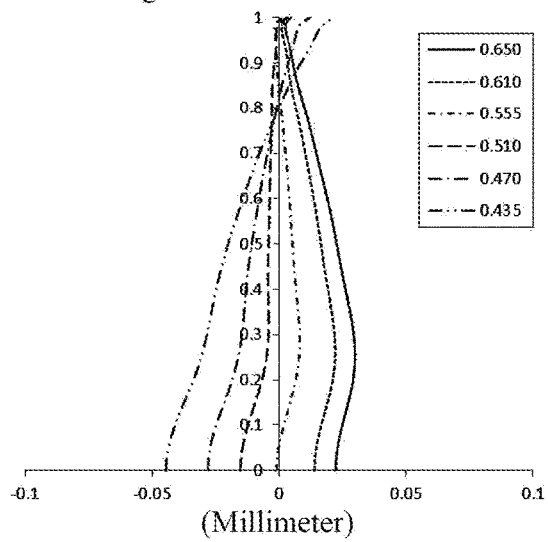
FIGS. 4A-4D respectively illustrate a longitudinal aberration curve, an astigmatic curve, a distortion curve and a lateral color curve of the optical imaging lens assembly according to Embodiment 2.
Figure 4B:
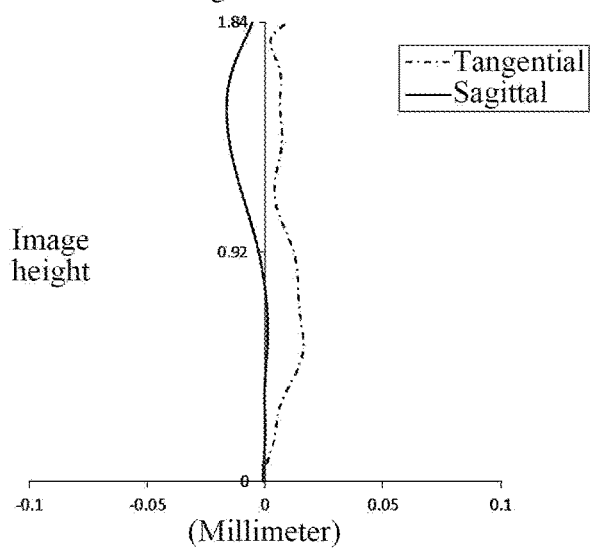
Figure 4C:
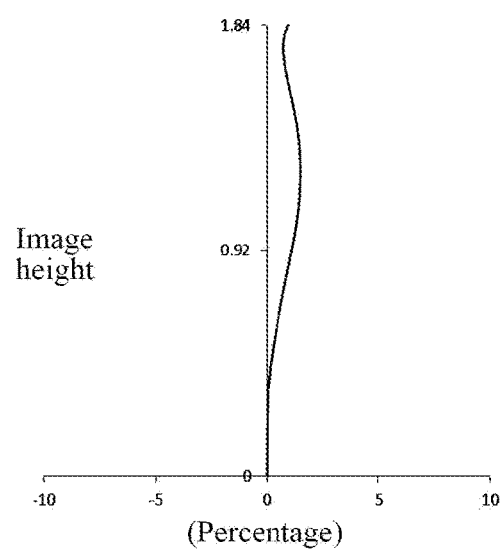
Figure 4D:
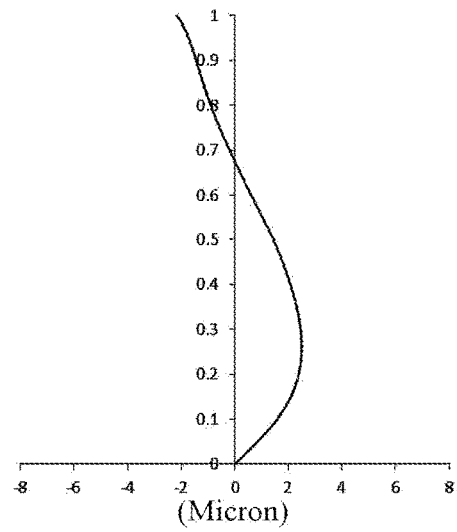

FIG. 4A illustrates the longitudinal aberration curve of the optical imaging lens assembly according to Embodiment 2, representing deviations of focal points converged by light of different wavelengths after passing through the lens assembly. FIG. 4B illustrates the astigmatic curve of the optical imaging lens assembly according to Embodiment 2, representing a curvature of a tangential plane and a curvature of a sagittal plane. FIG. 4C illustrates the distortion curve of the optical imaging lens assembly according to Embodiment 2, representing the amounts of distortion corresponding to different image heights. FIG. 4D illustrates the lateral color curve of the optical imaging lens assembly according to Embodiment 2, representing deviations of different image heights on an imaging plane after light passes through the lens assembly. It can be seen from FIG. 4A to FIG. 4D that the optical imaging lens assembly provided in Embodiment 2 can achieve good imaging quality.

Embodiment 3

Figure 5:
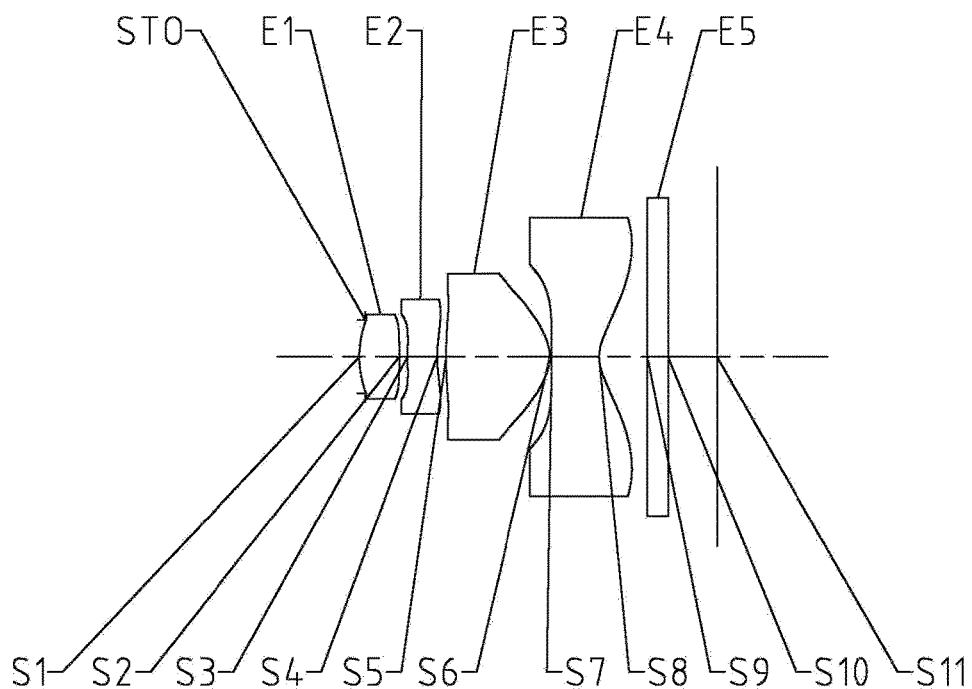
FIG. 5 is a schematic structural diagram illustrating an optical imaging lens assembly according to Embodiment 3 of the present disclosure.

An optical imaging lens assembly according to Embodiment 3 of the present disclosure is described below with reference to FIG. 5 to FIG. 6D. FIG. 5 illustrates a schematic structural diagram of the optical imaging lens assembly according to Embodiment 3 of the present disclosure.

As shown in FIG. 5, the optical imaging lens assembly from an object side to an image side sequentially includes: a diaphragm STO, a first lens E1, a second lens E2, a third lens E3, a fourth lens E4, an optical filter E5 and an imaging plane S11.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the respective surfaces S1 to S10 and is finally imaged on the imaging plane S11.

In this embodiment, a total effective focal length f of the optical imaging lens assembly is 1.24 mm, a total length TTL of the optical imaging lens assembly is 3.64 mm, half of a diagonal length ImgH of an effective pixel area on the imaging plane S11 of the optical imaging lens assembly is 1.81 mm, half of a maximum field-of-view Semi-FOV of the optical imaging lens assembly is 38.76°, an F number Fno of the optical imaging lens assembly is 1.66, a distance EIN from an object-side surface of the first lens to the image-side surface of the fourth lens parallel to the optical axis at ½ of the entrance pupil diameter of the optical imaging lens assembly is 5.26 mm, an axial distance SAG32 from an intersection of the image-side surface of the third lens and the optical axis to a vertex of an effective radius of the image-side surface of the third lens is −0.52 mm, and a maximum effective radius DT32 of the image-side surface of the third lens is 0.85 mm.

Table 5 is a table illustrating basic parameters of the optical imaging lens assembly of Embodiment 3, where the units for the radius of curvature, the thickness/distance and the focal length are millimeter (mm). Table 6 shows high-order coefficients applicable to each aspheric surface in Embodiment 3, where the surface shape of each aspheric surface may be defined by the formula (1) given in the above Embodiment 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | 2.9000 | | | | |
| STO | Spherical | Infinite | −0.0623 | | | | |
| S1 | Aspheric | 1.0293 | 0.4044 | 1.55 | 56.1 | 1.99 | −0.8063 |
| S2 | Aspheric | 17.0275 | 0.0866 | | | | 90.0000 |

TABLE 5-continued

| Surface number | Surface type | Radius of curvature | Thickness/ Distance | Material Refractive index | Abbe number | Focal length | Conic coefficient |
|---|---|---|---|---|---|---|---|
| S3 | Aspheric | 3.4483 | 0.3000 | 1.67 | 20.4 | −4.14 | −47.7257 |
| S4 | Aspheric | 1.4797 | 0.0909 | | | | −7.9576 |
| S5 | Aspheric | 4.6970 | 1.0588 | 1.55 | 56.1 | 0.75 | −45.9412 |
| S6 | Aspheric | −0.4146 | 0.0200 | | | | −3.0925 |
| S7 | Aspheric | −30.0000 | 0.4797 | 1.55 | 56.1 | −0.69 | −90.0000 |
| S8 | Aspheric | 0.3840 | 0.4912 | | | | −3.9311 |
| S9 | Spherical | Infinite | 0.2100 | 1.52 | 64.2 | | |
| S10 | Spherical | Infinite | 0.4983 | | | | |
| S11 | Spherical | Infinite | | | | | |

TABLE 6

| Surface number | A4 | A6 | A8 | A10 | A12 |
|---|---|---|---|---|---|
| S1 | 4.3510E−03 | 6.6121E+00 | −2.9630E+02 | 7.5138E+03 | −1.1679E+05 |
| S2 | −1.2670E+00 | −3.7586E+00 | 1.8984E+02 | −4.1359E+03 | 5.0793E+04 |
| S3 | −2.1913E+00 | 5.5489E+00 | −1.4527E+02 | 1.9504E+03 | −1.6583E+04 |
| S4 | −6.7307E−01 | 3.9682E−01 | −3.6542E+00 | 6.4341E+00 | 1.7568E+02 |
| S5 | 8.4018E−02 | 5.6218E−01 | −1.0808E+01 | 4.9592E+0J | −4.4967E+01 |
| S6 | −6.4020E−01 | 2.0552E+00 | −9.8551E+00 | 4.0194E+01 | −1.0927E+02 |
| S7 | 1.9992E−01 | −2.9990E+00 | 1.0006E+01 | −1.9657E+01 | 1.9825E+01 |
| S8 | −3.0736E−01 | 3.9159E−01 | −4.7393E−01 | 4.5160E−01 | −3.2594E−01 |

| Surface number | A14 | A16 | A18 | A20 |
|---|---|---|---|---|
| S1 | 1.1355E+06 | −6.7618E+06 | 2.2565E+07 | −3.2355E+07 |
| S2 | −3.8730E+05 | 1.8013E+06 | −4.7032E+06 | 5.2980E+06 |
| S3 | 7.5964E+04 | −1.2615E+05 | −2.8339E+05 | 1.0400E+06 |
| S4 | −1.5116E+03 | 5.3689E+03 | −9.4363E+03 | 6.8028E+03 |
| S5 | −5.1056E+02 | 2.2749E+03 | −3.9804E+03 | 2.6283E+03 |
| S6 | 1.8753E+02 | −1.9050E+02 | 1.0173E+02 | −2.1048E+01 |
| S7 | −2.1731E+00 | −1.6175E+01 | 1.4954E+01 | −4.2374E+00 |
| S8 | 1.7090E−01 | −6.1165E−02 | 1.3205E−02 | −1.2693E−03 |

Figures 6A, 6B:
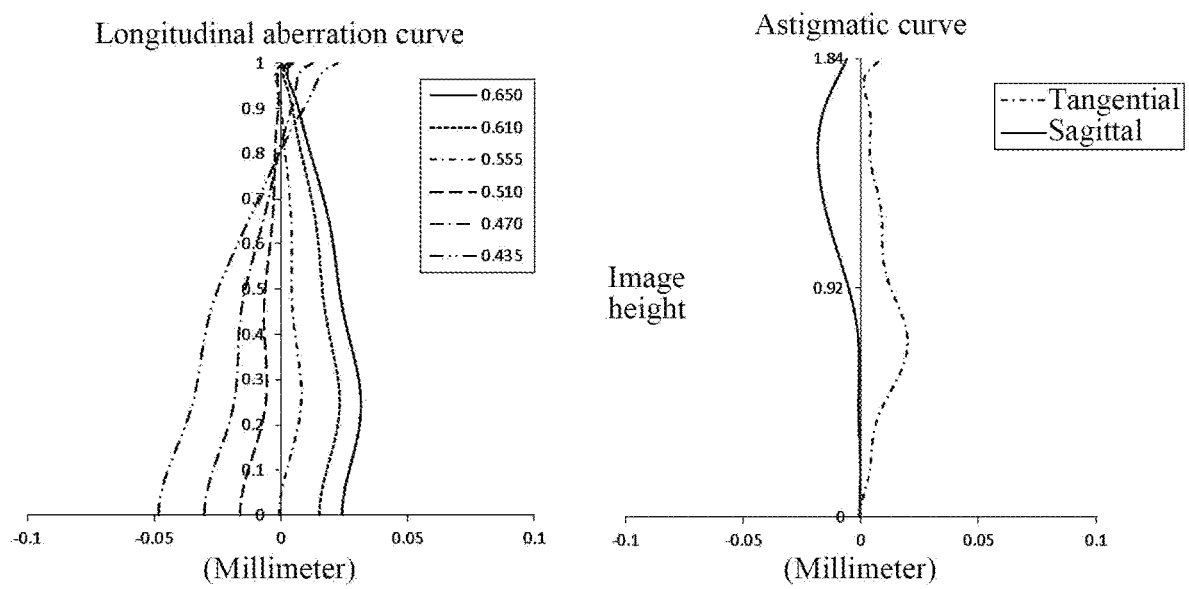

FIG. 6A illustrates the longitudinal aberration curve of the optical imaging lens assembly according to Embodiment 3, representing deviations of focal points converged by light of different wavelengths after passing through the lens assembly. FIG. 6B illustrates the astigmatic curve of the optical imaging lens assembly according to Embodiment 3, representing a curvature of a tangential plane and a curvature of a sagittal plane. FIG. 6C illustrates the distortion curve of the optical imaging lens assembly according to Embodiment 3, representing the amounts of distortion corresponding to different image heights. FIG. 6D illustrates the lateral color curve of the optical imaging lens assembly according to Embodiment 3, representing deviations of different image heights on an imaging plane after light passes through the lens assembly. It can be seen from FIG. 6A to FIG. 6D that the optical imaging lens assembly provided in Embodiment 3 can achieve good imaging quality.

Embodiment 4

An optical imaging lens assembly according to Embodiment 4 of the present disclosure is described below with reference to FIG. 7 to FIG. 8D. FIG. 7 illustrates a schematic structural diagram of the optical imaging lens assembly according to Embodiment 4 of the present disclosure.

As shown in FIG. 7, the optical imaging lens assembly from an object side to an image side sequentially includes: a diaphragm STO, a first lens E1, a second lens E2, a third lens E3, a fourth lens E4, an optical filter E5 and an imaging plane S11.

The first lens E1 has positive refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the respective surfaces S1 to S10 and is finally imaged on the imaging plane S11.

In this embodiment, a total effective focal length f of the optical imaging lens assembly is 1.23 mm, a total length TTL of the optical imaging lens assembly is 3.64 mm, half of a diagonal length ImgH of an effective pixel area on the imaging plane S11 of the optical imaging lens assembly is 1.81 mm, half of a maximum field-of-view Semi-FOV of the optical imaging lens assembly is 38.12°, an F number Fno of the optical imaging lens assembly is 1.63, a distance EIN from an object-side surface of the first lens to the image-side surface of the fourth lens parallel to the optical axis at ½ of the entrance pupil diameter of the optical imaging lens assembly is 5.37 mm, an axial distance SAG32 from an intersection of the image-side surface of the third lens and the optical axis to a vertex of an effective radius of the image-side surface of the third lens is −0.43 mm, and a maximum effective radius DT32 of the image-side surface of the third lens is 0.85 mm.

Table 7 is a table illustrating basic parameters of the optical imaging lens assembly of Embodiment 4, where the units for the radius of curvature, the thickness/distance and the focal length are millimeter (mm). Table 8 shows high-order coefficients applicable to each aspheric surface in Embodiment 4, where the surface shape of each aspheric surface may be defined by the formula (1) given in the above Embodiment 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Soherical | Infinite | 2.8090 | | | | |
| STO | Spherical | Infinite | 0.0100 | | | | |
| S1 | Aspheric | 1.2216 | 0.4503 | 1.55 | 56.1 | 2.44 | −2.1908 |
| S2 | Aspheric | 13.0589 | 0.0681 | | | | −90.0000 |
| S3 | Aspheric | 1.2732 | 0.3000 | 1.67 | 20.4 | 49.88 | −19.1863 |
| S4 | Aspheric | 1.1991 | 0.1308 | | | | −4.0077 |
| S5 | Aspheric | 30.0000 | 1.0522 | 1.55 | 56.1 | 0.80 | 90.0000 |
| S6 | Aspheric | −0.4369 | 0.0200 | | | | −3.7303 |
| S7 | Aspheric | −50.0000 | 0.4588 | 1.55 | 56.1 | −0.71 | −90.0000 |
| S8 | Aspheric | 0.3903 | 0.4730 | | | | −4.0025 |
| S9 | Spherical | Infinite | 0.2100 | 1.52 | 64.2 | | |
| S10 | Spherical | Infinite | 0.4768 | | | | |
| S11 | Spherical | Infinite | | | | | |

TABLE 8

| Surface number | A4 | A6 | A8 | A10 | A12 |
|---|---|---|---|---|---|
| S1 | −4.2396E−02 | 2.3251E+00 | −7.4862E+01 | 1.0858E+03 | −8.5579E+03 |
| S2 | −2.7680E+00 | 1.0695E+01 | −3.4482E+01 | −3.8677E+02 | 7.3576E+03 |
| S3 | −1.7700E+00 | 6.7473E−01 | −3.6603E+01 | 5.1004E+02 | −3.6698E+03 |
| S4 | −1.4664E−01 | −5.8306E+00 | 4.2487E+01 | −2.3304E+02 | 1.0553E+03 |
| S5 | 5.0684E−01 | −1.3504E+00 | 1.4834E−01 | 1.0339E+01 | −4.5346E+01 |
| S6 | −1.1847E+00 | 8.6887E+00 | −5.4293E+01 | 2.3759E+02 | −6.8483E+02 |
| S7 | −1.6775E−01 | −3.7565E−01 | −5.6867E+00 | 4.5104E+01 | −1.5379E+02 |
| S8 | −4.0698E−01 | 6.3823E−01 | −8.9614E−01 | 9.3770E−01 | −7.1187E−01 |

| Surface number | A14 | A16 | A18 | A20 |
|---|---|---|---|---|
| S1 | 2.7923E+04 | 4.8002E+04 | −6.0509E+05 | 1.2211E+06 |
| S2 | −5.6272E+04 | 2.3235E+05 | −5.0835E+05 | 4.6232E+05 |
| S3 | 1.6307E+04 | −4.3546E+04 | 5.9893E+04 | −2.7477E+04 |
| S4 | −3.6059E+03 | 8.1032E+03 | −1.0380E+04 | 5.7102E+03 |
| S5 | 1.0081E+02 | −1.6590E+02 | 2.1238E+02 | −1.3770E+02 |
| S6 | 1.2745E+03 | −1.4671E+03 | 9.4677E+02 | −2.6118E+02 |
| S7 | 2.9337E+02 | −3.2326E+02 | 1.9199E+02 | −4.7506E+01 |
| S8 | 3.8208E−01 | −1.3815E−01 | 3.0042E−02 | −2.9293E−03 |

Figure 8A:
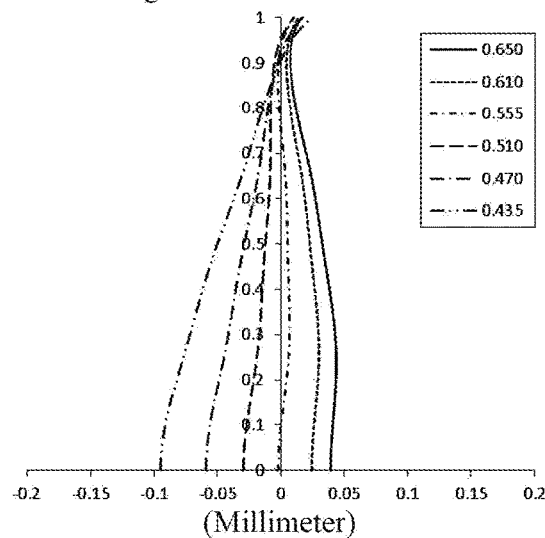
FIGS. 8A-8D respectively illustrate a longitudinal aberration curve, an astigmatic curve, a distortion curve and a lateral color curve of the optical imaging lens assembly according to Embodiment 4.
Figure 8B:
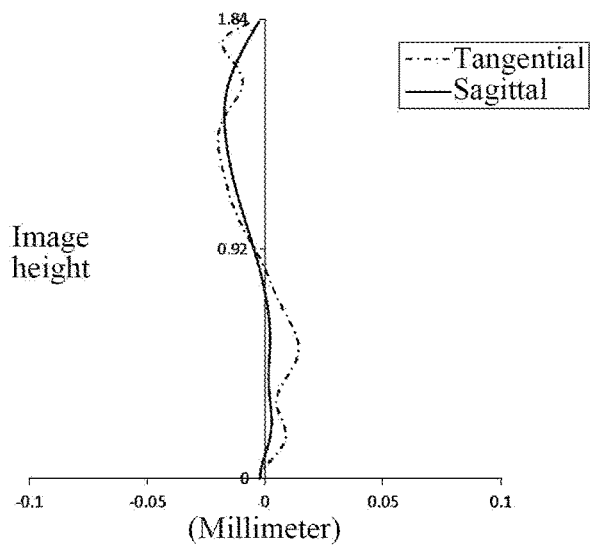
Figure 8C:
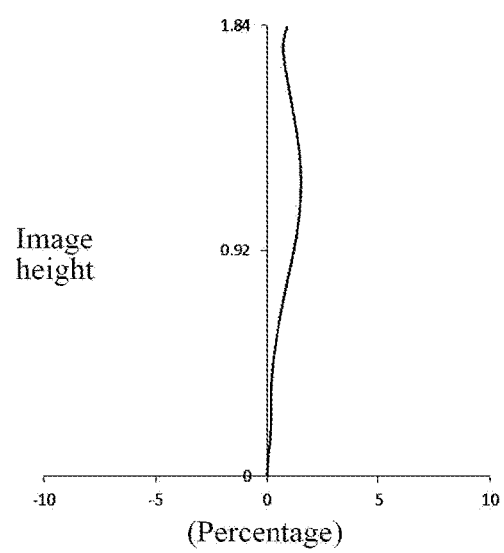
Figure 8D:
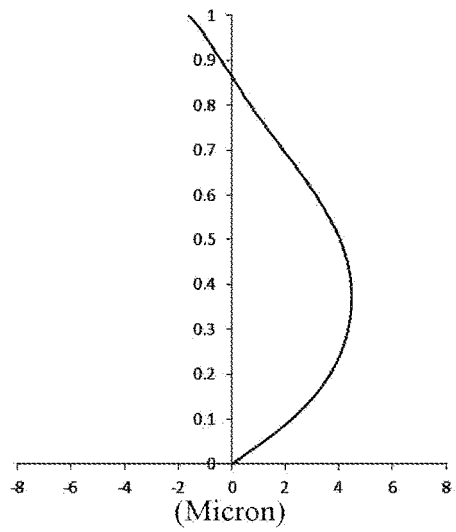

FIG. 8A illustrates the longitudinal aberration curve of the optical imaging lens assembly according to Embodiment 4, representing deviations of focal points converged by light of different wavelengths after passing through the lens assembly. FIG. 8B illustrates the astigmatic curve of the optical imaging lens assembly according to Embodiment 4, representing a curvature of a tangential plane and a curvature of a sagittal plane. FIG. 8C illustrates the distortion curve of the optical imaging lens assembly according to Embodiment 4, representing the amounts of distortion corresponding to different image heights. FIG. 8D illustrates the lateral color curve of the optical imaging lens assembly according to Embodiment 4, representing deviations of different image heights on an imaging plane after light passes through the lens assembly. It can be seen from FIG. 8A to FIG. 8D that the optical imaging lens assembly provided in Embodiment 4 can achieve good imaging quality.

Embodiment 5

An optical imaging lens assembly according to Embodiment 5 of the present disclosure is described below with reference to FIG. 9 to FIG. 10D. FIG. 9 illustrates a schematic structural diagram of the optical imaging lens assembly according to Embodiment 5 of the present disclosure.

As shown in FIG. 9, the optical imaging lens assembly from an object side to an image side sequentially includes: a diaphragm STO, a first lens E1, a second lens E2, a third lens E3, a fourth lens E4, an optical filter E5 and an imaging plane S11.

The first lens E1 has positive refractive power, an object-side surface S1 of the first lens is a convex surface, and an image-side surface S2 of the first lens is a convex surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The optical filter E5 has an object-side surface S9 and an image-side surface S10. Light from an object sequentially passes through the respective surfaces S1 to S10 and is finally imaged on the imaging plane S11.

In this Embodiment, a total effective focal length f of the optical imaging lens assembly is 1.24 mm, a total length TTL of the optical imaging lens assembly is 3.64 mm, half of a diagonal length ImgH of an effective pixel area on the imaging plane S11 of the optical imaging lens assembly is 1.94 mm, half of a maximum field-of-view Semi-FOV of the optical imaging lens assembly is 38.35°, an F number Fno of the optical imaging lens assembly is 1.55, a distance EIN from an object-side surface of the first lens to the image-side surface of the fourth lens parallel to the optical axis at ½ of the entrance pupil diameter of the optical imaging lens assembly is 5.46 mm, an axial distance SAG32 from an intersection of the image-side surface of the third lens and the optical axis to a vertex of an effective radius of the image-side surface of the third lens is −0.42 mm, and a maximum effective radius DT32 of the image-side surface of the third lens is 0.83 mm.

Table 9 is a table illustrating basic parameters of the optical imaging lens assembly of Embodiment 5, where the units for the radius of curvature, the thickness/distance and the focal length are millimeter (mm). Table 10-1 and table 10-2 show high-order coefficients applicable to each aspheric surface in Embodiment 5, where the surface shape of each aspheric surface may be defined by the formula (1) given in the above Embodiment 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 2.9800 | | | | |
| STO | Spherical | Infinite | −0.0695 | | | | |
| S1 | Aspheric | 1.0299 | 0.4378 | 1.55 | 56.1 | 1.69 | −2.1908 |
| S2 | Aspheric | −7.6010 | 0.0938 | | | | −90.0000 |
| S3 | Aspheric | 3.9203 | 0.3000 | 1.67 | 20.4 | −4.21 | −19.1863 |
| S4 | Aspheric | 1.5871 | 0.1001 | | | | −4.0077 |
| S5 | Aspheric | 50.0000 | 1.0180 | 1.55 | 56.1 | 0.87 | 90.0000 |
| S6 | Aspheric | −0.4758 | 0.0968 | | | | −3.7303 |
| S7 | Aspheric | −50.0000 | 0.4368 | 1.55 | 56.1 | −0.80 | −90.0000 |
| S8 | Aspheric | 0.4419 | 0.4714 | | | | −4.0025 |
| S9 | Spherical | Infinite | 0.2100 | 1.52 | 64.2 | | |
| S10 | Spherical | Infinite | 0.4752 | | | | |
| S11 | Spherical | Infinite | | | | | |

TABLE 10-1

| Surface number | A4 | A6 | A8 | A10 | A12 | A14 | A16 |
|---|---|---|---|---|---|---|---|
| S1 | −3.1230E−02 | 7.4015E+00 | −2.7691E+02 | 5.9225E+03 | −7.9037E+04 | 6.6210E+05 | −3.3947E+06 |
| S2 | −1.2835E+00 | −2.4323E+00 | 1.1372E+02 | −2.2416E+03 | 2.5516E+04 | −1.8055E+05 | 7.6951E+05 |
| S3 | −2.2541E+00 | 6.0029E−01 | −2.5792E+01 | 3.6664E+02 | −4.1728E+03 | 3.4500E+04 | −1.9184E+05 |
| S4 | −5.2862E−01 | −3.1734E+00 | 3.1432E+01 | −2.2366E+02 | 1.1537E+03 | −3.6540E+03 | 5.5716E+03 |
| S5 | 2.6743E−01 | −1.9741E+00 | 2.1778E+00 | 5.3775E+01 | −5.7897E+02 | 3.2311E+03 | −1.0361E+04 |
| S6 | −1.1605E+00 | 6.8551E+00 | −8.7520E+01 | 1.1487E+03 | −1.0387E+04 | 6.3800E+04 | −2.7369E+05 |
| S7 | 8.7894E−01 | −1.8847E+01 | 1.6929E+02 | −9.9613E+02 | 3.9152E+03 | −1.0066E+04 | 1.5295E+04 |
| S8 | −3.9204E+00 | 1.6383E+01 | −6.1712E+01 | 1.8140E+02 | −4.0005E+02 | 6.5649E+02 | −8.0111E+02 |

TABLE 10-2

| Surface number | A18 | A20 | A22 | A24 | A26 | A28 | A30 |
|---|---|---|---|---|---|---|---|
| S1 | 9.7306E+06 | −1.1956E+07 | 0.0000E+00 | 0.0000E+00 | 0.0000E+00 | 0.0000E+00 | 0.0000E+00 |
| S2 | −1.8074E+06 | 1.7996E+06 | 0.0000E+00 | 0.0000E+00 | 0.0000E+00 | 0.0000E+00 | 0.0000E+00 |
| S3 | 5.9341E+05 | −7.3340E+05 | 0.0000E+00 | 0.0000E+00 | 0.0000E+00 | 0.0000E+00 | 0.0000E+00 |
| S4 | −1.2833E+03 | −3.5370E+03 | 0.0000E+00 | 0.0000E+00 | 0.0000E+00 | 0.0000E+00 | 0.0000E+00 |
| S5 | 1.7450E+04 | −1.1790E+04 | 0.0000E+00 | 0.0000E+00 | 0.0000E+00 | 0.0000E+00 | 0.0000E+00 |
| S6 | 8.3551E+05 | −1.8254E+06 | 2.8313E+06 | −3.0409E+06 | 2.1474E+06 | −8.9553E+05 | 1.6686E+05 |
| S7 | −6.8475E+03 | −2.3935E+04 | 6.0305E+04 | −7.0021E+04 | 4.6668E+04 | −1.7197E+04 | 2.7277E+03 |
| S8 | 7.2564E+02 | −4.8442E+02 | 2.3457E+02 | −7.9963E+01 | 1.8164E+01 | −2.4647E+00 | 1.5096E−01 |

Figure 10C:
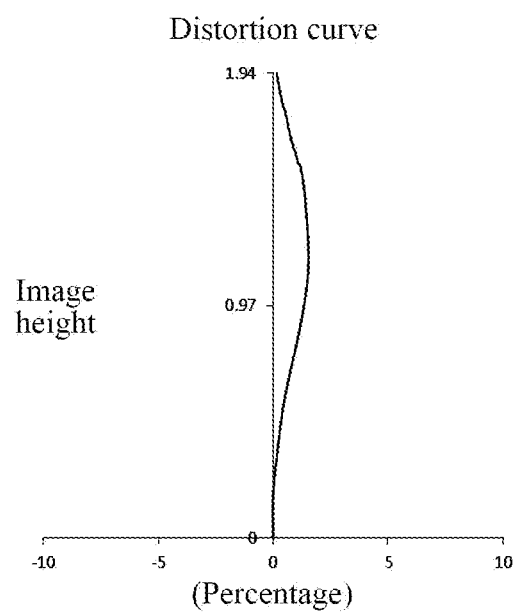
Figure 10D:
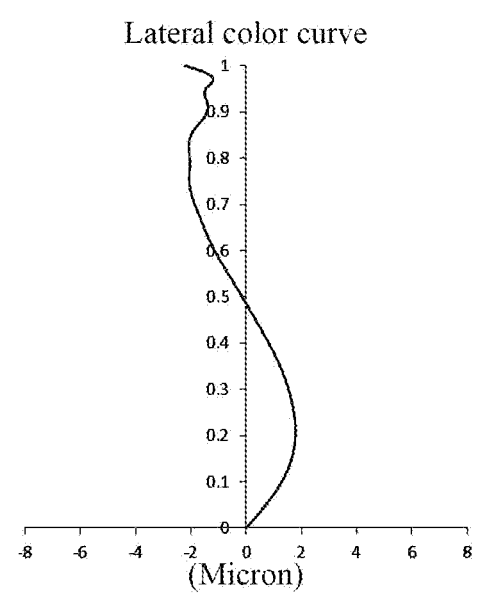

FIG. 10A illustrates the longitudinal aberration curve of the optical imaging lens assembly according to Embodiment 5, representing deviations of focal points converged by light of different wavelengths after passing through the lens assembly. FIG. 10B illustrates the astigmatic curve of the optical imaging lens assembly according to Embodiment 5, representing a curvature of a tangential plane and a curvature of a sagittal plane. FIG. 10C illustrates the distortion curve of the optical imaging lens assembly according to Embodiment 5, representing the amounts of distortion corresponding to different image heights. FIG. 10D illustrates the lateral color curve of the optical imaging lens assembly according to Embodiment 5, representing deviations of different image heights on an imaging plane after light passes through the lens assembly. It can be seen from FIG. 10A to FIG. 10D that the optical imaging lens assembly provided in Embodiment 5 can achieve good imaging quality.

In view of the above, Embodiments 1 to 5 respectively satisfy the relationship shown in Table 11.

TABLE 11

| Conditional | Embodiment | | | | |
|---|---|---|---|---|---|
| | 1 | 2 | 3 | 4 | 5 |
| M | 0.83 | 0.81 | 0.84 | 0.86 | 0.87 |
| f12/f23 | 2.94 | 3.36 | 3.72 | 2.42 | 2.42 |
| CT3/CT1 | 2.53 | 2.54 | 2.62 | 2.34 | 2.33 |
| Tan(Semi-FOV + CRAmax) | 3.44 | 3.27 | 3.18 | 2.69 | 2.83 |
| TD/ImgH | 1.25 | 1.34 | 1.35 | 1.37 | 1.28 |
| ETL/EIN | 1.20 | 1.21 | 1.21 | 1.19 | 1.19 |
| DT32/ARE32 | 2.03 | 2.16 | 2.11 | 2.10 | 1.94 |
| SAG32/SAG42 | −2.04 | −1.62 | −1.79 | −2.32 | −2.46 |
| R4/R8 | 3.82 | 4.24 | 3.85 | 3.07 | 3.59 |
| f1/f3 | 2.23 | 2.32 | 2.64 | 3.05 | 1.95 |
| OBL/ImgH | 1.52 | 1.60 | 1.60 | 1.55 | 1.54 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the optional embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, along an optical axis from an object side to an image side, sequentially comprising:
   a first lens having positive refractive power;
   a second lens having refractive power, and an object-side surface of the second lens being a convex surface;
   a third lens having refractive power, an object-side surface of the third lens being a convex surface, and an image-side surface of the third lens being a convex surface;
   a fourth lens having refractive power;
   a radius of curvature R4 of an image-side surface of the second lens and a radius of curvature R8 of an image-side surface of the fourth lens satisfy: 3.0<R4/R8<4.5; and
   half of a maximum field-of-view Semi-FOV of the optical imaging lens assembly and a maximum incident angle of a chief ray CRAmax of the optical imaging lens assembly to an electronic photosensitive component satisfying: 2.5<Tan(Semi-FOV+CRAmax)<3.5.

2. The optical imaging lens assembly according to claim 1, wherein a combined focal length f12 of the first lens and the second lens and a combined focal length f23 of the second lens and the third lens satisfy: 2.0<f12/f23<4.0.

3. The optical imaging lens assembly according to claim 1, wherein a center thickness CT1 of the first lens on the optical axis and a center thickness CT3 of the third lens on the optical axis satisfy: 2.0<CT3/CT1<3.0.

4. The optical imaging lens assembly according to claim 1, wherein a maximum effective radius DT32 of the image-side surface of the third lens and a contour curve length ARE32 from an intersection of the image-side surface of the third lens and the optical axis to the image-side surface of the third lens at ½ of an entrance pupil diameter of the optical imaging lens assembly satisfy: 1.5<DT32/ARE32<2.5.

5. The optical imaging lens assembly according to claim 1, wherein an axial distance SAG32 from an intersection of the image-side surface of the third lens and the optical axis to a vertex of an effective radius of the image-side surface of the third lens and an axial distance SAG42 from an intersection of an image-side surface of the fourth lens and the optical axis to a vertex of an effective radius of the image-side surface of the fourth lens satisfy: −3.0<SAG32/SAG42<−1.5.

6. The optical imaging lens assembly according to claim 1, wherein an effective focal length f1 of the first lens and an effective focal length f3 of the third lens satisfy: 1.5<f1/f3<3.5.

7. The optical imaging lens assembly according to claim 1, wherein a magnification M of the optical imaging lens assembly satisfies: 0.5<M<1.0.

8. The optical imaging lens assembly according to claim 1, wherein a distance TD from an object-side surface of the first lens to an image-side surface of the fourth lens on the optical axis and half of a diagonal length ImgH of an effective pixel area on an imaging plane of the optical imaging lens assembly satisfy: 1.0<TD/ImgH<1.5.

9. The optical imaging lens assembly according to claim 1, wherein, 1.0<ETL/EIN<1.5,
   EIN is a distance from an object-side surface of the first lens to an image-side surface of the fourth lens parallel to the optical axis at ½ of an entrance pupil diameter of the optical imaging lens assembly; and
   ETL is a distance from the object-side surface of the first lens to an imaging plane of the optical imaging lens assembly parallel to the optical axis at ½ of the entrance pupil diameter of the optical imaging lens assembly.

10. The optical imaging lens assembly according to claim 1, wherein the optical imaging lens assembly further comprises a diaphragm, and $1.5 < \text{OBL}/\text{ImgH} < 2.0$, wherein OBL is a distance from an object to the diaphragm on the optical axis when the object is farthest from an imaging plane on the basis that the object is clearly imaged on the imaging plane of the optical imaging lens assembly, and ImgH is half of a diagonal length of an effective pixel area on an imaging plane of the optical imaging lens assembly.

11. An optical imaging lens assembly, along an optical axis from an object side to an image side, sequentially comprising:

a diaphragm;

a first lens having positive refractive power;

a second lens having refractive power, and an object-side surface of the second lens being a convex surface;

a third lens having refractive power, an object-side surface of the third lens being a convex surface, and an image-side surface of the third lens being a convex surface;

a fourth lens having refractive power; and $1.5 < \text{OBL}/\text{ImgH} < 2.0$, wherein OBL is a distance from an object to the diaphragm on the optical axis when the object is farthest from an imaging plane on the basis that the object is clearly imaged on the imaging plane of the optical imaging lens assembly, and ImgH is half of a diagonal length of an effective pixel area on an imaging plane of the optical imaging lens assembly.

12. The optical imaging lens assembly according to claim 11, wherein a combined focal length f12 of the first lens and the second lens and a combined focal length f23 of the second lens and the third lens satisfy: $2.0 < \text{f12}/\text{f23} < 4.0$.

13. The optical imaging lens assembly according to claim 11, wherein a center thickness CT1 of the first lens on the optical axis and a center thickness CT3 of the third lens on the optical axis satisfy: $2.0 < \text{CT3}/\text{CT1} < 3.0$.

14. The optical imaging lens assembly according to claim 11, wherein a maximum effective radius DT32 of the image-side surface of the third lens and a contour curve length ARE32 from an intersection of the image-side surface of the third lens and the optical axis to the image-side surface of the third lens at ½ of an entrance pupil diameter of the optical imaging lens assembly satisfy: $1.5 < \text{DT32}/\text{ARE32} < 2.5$.

15. The optical imaging lens assembly according to claim 11, wherein an axial distance SAG32 from an intersection of the image-side surface of the third lens and the optical axis to a vertex of an effective radius of the image-side surface of the third lens and an axial distance SAG42 from an intersection of an image-side surface of the fourth lens and the optical axis to a vertex of an effective radius of the image-side surface of the fourth lens satisfy: $-3.0 < \text{SAG32}/\text{SAG42} < -1.5$.

16. The optical imaging lens assembly according to claim 11, wherein a radius of curvature R4 of an image-side surface of the second lens and a radius of curvature R8 of an image-side surface of the fourth lens satisfy: $3.0 < \text{R4}/\text{R8} < 4.5$.

17. The optical imaging lens assembly according to claim 11, wherein an effective focal length f1 of the first lens and an effective focal length f3 of the third lens satisfy: $1.5 < \text{f1}/\text{f3} < 3.5$.

18. The optical imaging lens assembly according to claim 11, wherein a magnification M of the optical imaging lens assembly satisfies: $0.5 < M < 1.0$.

19. The optical imaging lens assembly according to claim 11, wherein a distance TD from an object-side surface of the first lens to an image-side surface of the fourth lens on the optical axis and half of the diagonal length ImgH of the effective pixel area on the imaging plane of the optical imaging lens assembly satisfy: $1.0 < \text{TD}/\text{ImgH} < 1.5$.

20. An optical imaging lens assembly, along an optical axis from an object side to an image side, sequentially comprising:

a first lens having positive refractive power;

a second lens having refractive power, and an object-side surface of the second lens being a convex surface;

a third lens having refractive power, an object-side surface of the third lens being a convex surface, and an image-side surface of the third lens being a convex surface;

a fourth lens having refractive power;

half of a maximum field-of-view Semi-FOV of the optical imaging lens assembly and a maximum incident angle of a chief ray CRAmax of the optical imaging lens assembly to an electronic photosensitive component satisfying: $2.5 < \text{Tan}(\text{Semi-FOV} + \text{CRAmax}) < 3.5$; and a magnification M of the optical imaging lens assembly satisfies: $0.5 < M < 1.0$.

\* \* \* \* \*